(12) United States Patent
    Derham

(10) Patent No.:    US 12,571,932 B2
(45) Date of Patent:        Mar. 10, 2026

(54) WINDOW LOCKING DEVICE AND SYSTEM

(71) Applicant: Mighton Products Limited, Saffron Walden (GB)

(72) Inventor: Michael Derham, Saffron Walden (GB)

(73) Assignee: Mighton Products Limited, Saffron Walden (GB)

( * ) Notice: Subject to any disclaimer, the term of this patent is extended or adjusted under 35 U.S.C. 154(b) by 42 days.

(21) Appl. No.: 18/553,522

(22) PCT Filed: Mar. 29, 2022

(86) PCT No.: PCT/GB2022/050772
    § 371 (c)(1),
    (2) Date: Sep. 29, 2023

(87) PCT Pub. No.: WO2022/208063
    PCT Pub. Date: Oct. 6, 2022

(65)            Prior Publication Data
    US 2024/0192397 A1      Jun. 13, 2024

(30)        Foreign Application Priority Data

Mar. 30, 2021    (GB) .................................... 2104492

(51) Int. Cl.
    *G01V 3/08*            (2006.01)
    *E05C 3/00*            (2006.01)
    *E05C 3/04*            (2006.01)
(52) U.S. Cl.
    CPC .............. *G01V 3/081* (2013.01); *E05C 3/004* (2013.01); *E05C 3/045* (2013.01)
(58) Field of Classification Search
    CPC .......... G01V 3/081; E05C 3/004; E05C 3/045
    See application file for complete search history.

(56)            References Cited

U.S. PATENT DOCUMENTS 7,093,392 B2 *   8/2006   Derham .............. E05D 13/1207
                                                        49/447
    D581,247 S   *  11/2008   Durrant ......................... D8/331
                    (Continued)

FOREIGN PATENT DOCUMENTS

GB        2529891        3/2016
    JP      2008/274669     11/2008
                    (Continued)

OTHER PUBLICATIONS

International Search Report and Written Opinion of the International Searching Authority from a corresponding International patent application (PCT/GB2022/050772) bearing a mailing date of Jul. 19, 2022.

(Continued)

*Primary Examiner* — Hoi C Lau
(74) *Attorney, Agent, or Firm* — Brown & Brown IP Law PLLC

(57)            ABSTRACT

A locking device for a sash window having a window sash moveably mounted in a window frame, the locking device comprising a body and a locking element moveable between an unlocked position and a locked position. The device includes a sensor system to detect whether the window sash is in a closed position in the window frame and also to detect whether the locking element is in the locked position. The device includes a first sensor comprising a first lock sensor component mounted for movement with the locking element and a second lock sensor component mounted to the body. The device also includes a second sensor comprising a first window sensor component arranged to be mounted to the sash window and a second window sensor component mounted to the body. The device includes a detent mechanism which acts with the positional arrangement of the sensors to provide a reliable system.

23 Claims, 8 Drawing Sheets

(56)                References Cited

U.S. PATENT DOCUMENTS

| | | | | |
|---|---|---|---|---|
| 8,726,572 B2* | 5/2014 | Derham | E05C 17/08 | 49/141 |
| 8,881,461 B2* | 11/2014 | Derham | E05B 65/0864 | 292/338 |
| 9,309,711 B2* | 4/2016 | Derham | E05F 11/24 | |
| 9,816,300 B2* | 11/2017 | Derham | E05C 7/005 | |
| 9,933,243 B2* | 4/2018 | Thibault | G01B 7/14 | |
| 10,228,266 B1* | 3/2019 | McGruder | E05B 17/10 | |
| 10,317,247 B1* | 6/2019 | Wernlund | E06B 7/28 | |
| 10,633,897 B2* | 4/2020 | Liang | E05B 65/0841 | |
| 11,118,376 B1* | 9/2021 | Liang | E06B 3/5063 | |
| 11,136,797 B2* | 10/2021 | Derham | E05B 65/0852 | |
| 11,168,492 B1* | 11/2021 | Liang | E05B 17/2053 | |
| 11,459,794 B2* | 10/2022 | Derham | E05B 47/0012 | |
| 11,993,964 B2* | 5/2024 | Derham | E05C 1/006 | |
| 12,359,477 B1* | 7/2025 | Liang | E05C 3/004 | |
| 12,428,886 B1* | 9/2025 | Liang | E05C 21/00 | |
| 2006/0087130 A1* | 4/2006 | Liang | E05B 15/102 | 292/242 |
| 2008/0252451 A1* | 10/2008 | Buchhalter | G08B 13/06 | 49/141 |
| 2009/0140858 A1* | 6/2009 | Gore | G08B 29/046 | 340/547 |
| 2010/0026489 A1* | 2/2010 | Jordan | G08B 25/14 | 340/541 |
| 2011/0113695 A1* | 5/2011 | Derham | E05B 65/0864 | 292/195 |
| 2013/0082469 A1* | 4/2013 | Derham | E05C 19/003 | 292/277 |
| 2014/0026709 A1* | 1/2014 | Derham | E05F 5/00 | 74/528 |
| 2014/0035297 A1* | 2/2014 | Kreuser | E05B 9/082 | 292/202 |
| 2014/0062466 A1* | 3/2014 | Thibault | G01B 7/14 | 324/207.22 |

| | | | | |
|---|---|---|---|---|
| 2014/0239649 A1* | 8/2014 | Derham | E05C 19/003 | 292/277 |
| 2015/0015000 A1* | 1/2015 | Derham | E05B 65/0864 | 292/194 |
| 2015/0252596 A1* | 9/2015 | Liang | E05C 1/12 | 292/163 |
| 2015/0252600 A1* | 9/2015 | Liang | E05B 65/0841 | 292/169 |
| 2016/0060920 A1* | 3/2016 | Liang | E05C 3/045 | 292/165 |
| 2016/0060921 A1* | 3/2016 | Liang | E05B 9/08 | 292/34 |
| 2016/0069108 A1* | 3/2016 | Liang | E05B 9/08 | 292/165 |
| 2016/0343227 A1* | 11/2016 | Shih | G08B 17/107 | |
| 2017/0152688 A1* | 6/2017 | Liang | E06B 3/5063 | |
| 2017/0362862 A1* | 12/2017 | Derham | E05B 65/0852 | |
| 2018/0230710 A1* | 8/2018 | Liang | E05B 17/2038 | |
| 2018/0340355 A1* | 11/2018 | Liang | E05B 65/087 | |
| 2020/0354991 A1* | 11/2020 | Derham | E05B 47/0012 | |
| 2021/0404228 A1* | 12/2021 | Derham | E05C 7/005 | |
| 2022/0270451 A1* | 8/2022 | Derham | G08B 13/08 | |
| 2022/0341229 A1* | 10/2022 | Derham | E05B 45/06 | |
| 2024/0141694 A1* | 5/2024 | Derham | E05B 15/02 | |
| 2024/0192397 A1* | 6/2024 | Derham | E05B 65/08 | |

FOREIGN PATENT DOCUMENTS

| | | |
|---|---|---|
| JP | 2013/044217 | 3/2013 |
| WO | 2020/234598 | 11/2020 |
| WO | 2021/053330 | 3/2021 |

OTHER PUBLICATIONS

UKIPO Search Report from a corresponding GB patent application (GB 2104492.0) bearing a mailing date of Sep. 28, 2021.

* cited by examiner

WINDOW LOCKING DEVICE AND SYSTEM

FIELD OF THE INVENTION

The present invention relates to a locking device for a sash window, a window assembly comprising a window sash, a window frame and a locking device, a home automation system comprising at least one window status sensor for monitoring a sash window and to a method of providing a window status sensor system.

BACKGROUND TO THE INVENTION

Security systems often include sensors to detect the unauthorised opening of a window, for example, during a burglary. Such sensors are generally located on a window sash, with a corresponding sensing device being mounted on the window frame. As the window is moved towards an open position, the sensor is activated and an alarm signal may be generated. Such an alarm signal generally consists of a loud audible alarm which provides an alert to the property owner (or surrounding inhabitants) and also acts to scare the intruder due to the awareness of the unauthorised act having been detected.

Such alarms can be triggered inadvertently and these audible alarms may no longer attract the attention of surrounding, unconnected people. Accordingly, an intruder may now continue with the unauthorised access in the knowledge that the alarm may not attract the attention of any unconnected people. In addition, the property may be located in a remote position with few, if any, surrounding people.

Many people now simply assume that an alarm is a false alarm and will not necessarily act on the triggering of an alarm system. This may be particularly relevant if such an alarm system has previously been triggered with a false alarm situation.

Accordingly, such alarm systems must be very robust to prevent false alarms and/or the alarm signal must be transmitted to the responsible person or surveillance person. Such people may be located remote from the location and a transmission method will therefore be required.

In addition, these alarm systems for use with windows provide a simple check on whether the window is actually open or closed and no further information with regards to the status of the window is available.

Property owners may want to confirm the status of the property and, for example, may want to ensure that all the doors/windows are closed and/or locked, or the lights are off (or on, as required), or that any appliances etc. have the desired status. Such a status check generally requires a user to check each item or appliance individually. This can be time consuming and laborious and also is impractical in many situations.

As mentioned above, alarms are frequently used throughout establishments to monitor and detect unauthorised entry or potential access to a building. Such alarms generally comprise a central control system which communicates with several individual detectors placed strategically throughout the property. For example, the detector may include a movement sensor placed within an upper location of a room which would detect movement within the room.

The alarm is activated at a central activation point and following this, the detectors may then send signals to provide alerts of unauthorised movement etc. The control system may provide an audible alarm and/or a remote alert system whereby an appointed user or security company and/or a relevant authority is alerted to unexpected activity.

The detectors in such an alarm system may also be configured to show the status of a door or window and may confirm whether the window/door is open or closed.

Such window and door sensors generally comprise a proximity sensor which will alert the user as to whether a door or window sash is in a closed position.

Alternatively, the detector may be arranged to show that a handle, latch or fastener of the window is in a closed position to provide an indication that the window is secure.

However, there is a risk of an incorrect status being interpreted from the results of the detector in that the window may not actually be in a secured position even though the alarm system through the relevant detector shows that it is closed/locked/secured.

It is an aim of the present invention to overcome at least one problem associated with the prior art whether referred to herein or otherwise.

SUMMARY OF THE INVENTION

According to a first aspect of the invention, there is provided a locking device for a sash window having a window sash moveably mounted in a window frame, the locking device comprising:

a body for mounting to the sash window;

a locking element moveable between an unlocked position and a locked position; and a sensor system to detect whether the window sash is in a closed position in the window frame and also to detect whether the locking element is in the locked position, the sensor system comprising:

a first sensor and a second sensor;

the first sensor comprising a first lock sensor component mounted for movement with the locking element and a second lock sensor component mounted to the body; and the second sensor comprising a first window sensor component arranged to be mounted to the sash window and a second window sensor component mounted to the body.

The first lock sensor component may be mounted to the locking element.

The locking element may comprise a bore into which the first lock sensor component is located.

Preferably the first lock sensor component is integral with the locking element.

The locking element may be rotatably mounted in the body. Preferably the locking element comprises a peripheral engaging rim which is arranged to be rotated to locate within a keep to form a locked configuration. Preferably the locking element comprises a peripheral engaging rim which is arranged to be rotated through 180 degrees between an unlocked configuration and a locked configuration.

The locking device may comprise a handle for operating the locking element. In this case, the first lock sensor component may be mounted to the handle.

The handle may comprise a spindle and the locking element may be connected to the spindle. The handle may be integrally formed with the locking element.

Alternatively, the locking device may not comprise a handle.

The locking element may comprise a grip formation and/or thumb tab to enable a user to operate the locking element.

The first lock sensor component may comprise a magnet.

The second lock sensor component may comprise a reed switch

The first window sensor component may comprise a magnet. The second window sensor component may comprise a reed switch.

The locking device may comprise a detent mechanism which is arranged to releasably retain or detain the locking element in the locked position or the unlocked position.

The detent mechanism may comprise first and second detent formations which are arranged to engage with one another in order to detain the locking element in the locked position or the unlocked position.

The detent mechanism may comprise biasing means such that a threshold force must be applied to overcome the detent mechanism in order to move the locking element away from the locked position or the unlocked position.

The first detent formations may be provided on the handle. The second detent formations may be provided on the body. The first detent formations may comprise projections or lugs. The second detent formations may comprise recesses or notches. Preferably the detent mechanism comprises a pair of first detent formation and a corresponding pair of second detent formations which may be circumferentially spaced apart by substantially 180 degrees and wherein the handle may be rotatable through 180 degrees from a retained locked position to a retained unlocked position and in which, in the retained locked position, a first projection engages in a first recess and a second projection engages in a second recess and in the retained unlocked position, the first projection engages in the second recess and the second projection engages in the first recess.

Preferably the detent mechanism is in register with the first lock sensor and the second lock sensor such that when the detent mechanism engages the locking element in the locked position the first lock sensor locates directly above the second lock sensor. Preferably the detent mechanism is in register with the first lock sensor and the second lock sensor such that when the detent mechanism engages the locking element in the unlocked position the first lock sensor locates at a furthest point from the second lock sensor. Accordingly, the arrangement may provide a reliable signal which guarantees that the actual locking element is in the locked position even if the locking handle or other indication may not be totally aligned with a locked position and also minimises any chance of the sensor indicating a locked position when the locking element is in the unlocked position.

Preferably the locking element is rotatably mounted in the body, the first lock sensor may be mounted on the locking element for rotation therewith and wherein rotation of the locking element changes the separation distance between the first lock sensor and the second lock sensor. Preferably, in the locked position, the first lock sensor locates with a minimum possible separation distance relative to the second lock sensor and preferably in the unlocked position the first lock sensor locates with a maximum separation distance relative to the second lock sensor. Preferably the first lock sensor rotates about an axis with a radius of travel and wherein in a planar view, the position of the first lock sensor coincides with the position of the second lock sensor and in the unlocked position, the first lock sensor is spaced from the second lock sensor by twice the radius of travel.

The locking device may comprise a keep which is arranged to be mounted to the sash window, the keep being arranged to retain the locking element in order to secure the window in the closed position. The keep may be separate from the body.

The second window sensor component may be mounted in the keep. Alternatively, the second window sensor component may be mounted in a distinct housing which is separate from the keep and which is arranged to be mounted to the sash window.

The locking device may comprise communication means to communicate signals from each sensor to a remote unit. Preferably the communication means comprises Bluetooth communication means.

The communication means may be arranged to be connected to a control hub (control means). The control hub (control means) may be connected to a router in order to further communicate the signal(s) from the locking device.

The signals may be communicated directly (or indirectly through the hub) to a device, such as a smart phone.

The control means (control hub) may combine the signals from both sensors

The locking device may comprise a visual indicating to indicate to a user the status of the first sensor and/or the second sensor.

According to a second aspect of the invention there is provided a window assembly comprising a window sash, a window frame and a locking device, the locking device comprising:

a body for mounting to the sash window;

a locking element moveable between an unlocked position and a locked position; and a sensor system to detect whether the window sash is in a closed position in the window frame and also to detect whether the locking element is in the locked position, the sensor system comprising:

a first sensor and a second sensor;

the first sensor comprising a first lock sensor component mounted for movement with the locking element and a second lock sensor component mounted to the body; and the second sensor comprising a first window sensor component arranged to be mounted to the sash window and a second window sensor component mounted to the body.

According to a third aspect of the invention, there is provided a home automation system comprising a least one window status sensor system for monitoring a sash window having a window sash moveably mounted in a window frame and including a locking device comprising:

a body for mounting to the sash window;

a locking element moveable between an unlocked position and a locked position; and a sensor system to detect whether the window sash is in a closed position in the window frame and also to detect whether the locking element is in the locked position, the sensor system comprising:

a first sensor and a second sensor;

the first sensor comprising a first lock sensor component mounted for movement with the locking element and a second lock sensor component mounted to the body; and the second sensor comprising a first window sensor component arranged to be mounted to the sash window and a second window sensor component mounted to the body.

According to a fourth aspect of the invention there is provided a method of providing a window status sensor system, in which the window includes a locking device, the locking device comprising:

a body for mounting to the sash window;

a locking element moveable between an unlocked position and a locked position; and a sensor system to detect whether the window sash is in a closed position in the window frame and also to detect whether the locking element is in the locked position, the sensor system comprising:

a first sensor and a second sensor;

the first sensor comprising a first lock sensor component mounted for movement with the locking element and a second lock sensor component mounted to the body; and the second sensor comprising a first window sensor component arranged to be mounted to the sash window and a second window sensor component mounted to the body.

BRIEF DESCRIPTION OF THE DRAWINGS

Embodiments of the present invention will now be described, by way of example only, with reference to the accompanying drawings, in which.

DESCRIPTION OF THE PREFERRED EMBODIMENTS

Figure 1:
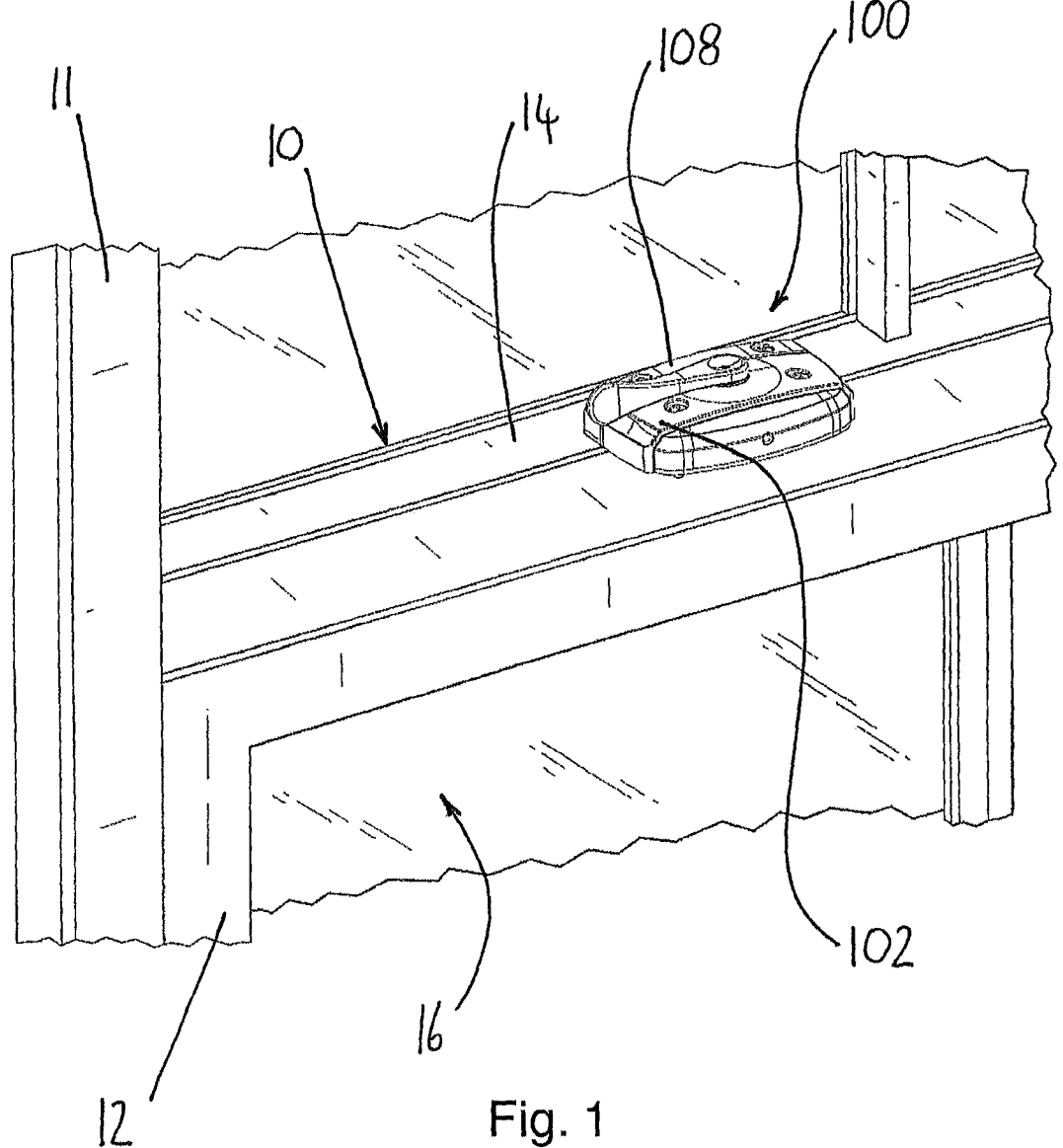
FIG. 1 is a perspective view of a locking device according to the invention, installed on a sash window.

The present invention provides a window status sensor system which may be of particular use with a sash window of a domestic property. The window status sensor system may cooperate with or may be integrated into a home automation system. In such a home automation system, a user may be able to monitor and/or control several items throughout the property. For example, a user may be able to monitor and/or control numerous domestic parameters such as the status of a light, the status of a domestic appliances, the condition/status of a smoke detector, the level of an oil tank etc. The home automation system may also be linked to the thermostat and may also be linked to cameras within or around the property. Such a home automation system may include a (control) hub (control means) and may be controlled by and monitored on a smartphone, tablet, remote PC etc.

A sash window generally comprises an upper window sash and a lower window sash. The window sashes are slidably mounted in vertical guide channels in a window frame such that the windows sashes can be moved up and down within the window frame. A sash window may be secured by a lock or fastener which is arranged to prevent the window sashes from moving in the window frame (i.e. to secure the window sashes in a closed position with respect to the frame. In this Locking devices for sash windows may be arranged to secure the window sashes to the window frame, or to secure the window sashes to one another such that both window sashes are secured in a closed position. In the latter case, a locking device or fastener may be provided adjacent an upper part of the lower sash which meets a lower part of the upper sash when both sashes are in a closed position. Part of the fastener is mounted on the lower sash and is arranged to engage with, or lock with another part of the fastener which is mounted on the upper sash. One example of such a fastener is known as a Fitch fastener or Fitch lock and includes a lock body, which is typically mounted on a top part (which may be known as a meeting rail) of the lower sash, and a keep, which is typically mounted on a bottom part of the upper sash. The latch body comprises a pivotally mounted locking element (operable by a lever handle) which is arranged to engage with part of the keep in order to secure the latch body to the keep. In this way, when both of the window sashes are in a closed position, the handle may be operated to lock the latch body to the keep in order to lock the window sashes in a closed position.

A window locking device according to the present invention is shown in FIGS. 1 to 9. The locking device 100 comprises a body 102, a handle 104, a locking mechanism 106, a keep 108 and a sensor system 110. The locking device 100 is arranged to be mounted to a sash window 10 in use. The sash window 10 comprises a window frame 11, a lower window sash 12 and an upper window sash 14.

The body 102 is arranged to be mounted to part of a window sash or window frame in use. The keep 108 is arranged to be mounted to part of a window sash or window frame in use. The locking device 100 is arranged to be mounted to an interior side 16 of the window 10 (i.e. inside a building) in use. FIG. 1 shows the locking device 100 in use mounted to the sash window 10. The body 102 is mounted to the lower window sash 12. The keep 108 is mounted to the upper window sash 14.

Figure 2:
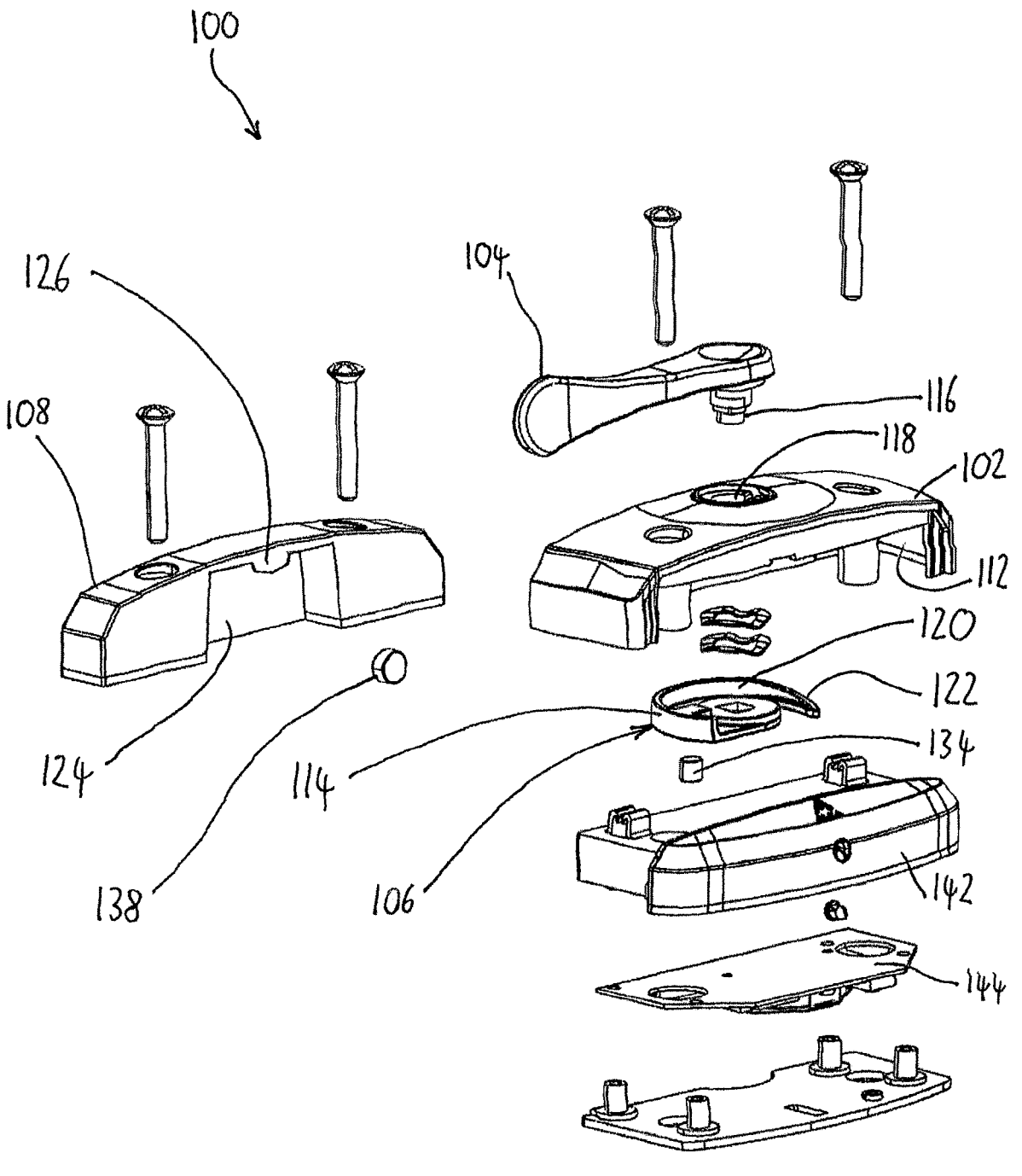
FIG. 2 is an exploded view of the locking device of FIG. 1.
Figure 3:
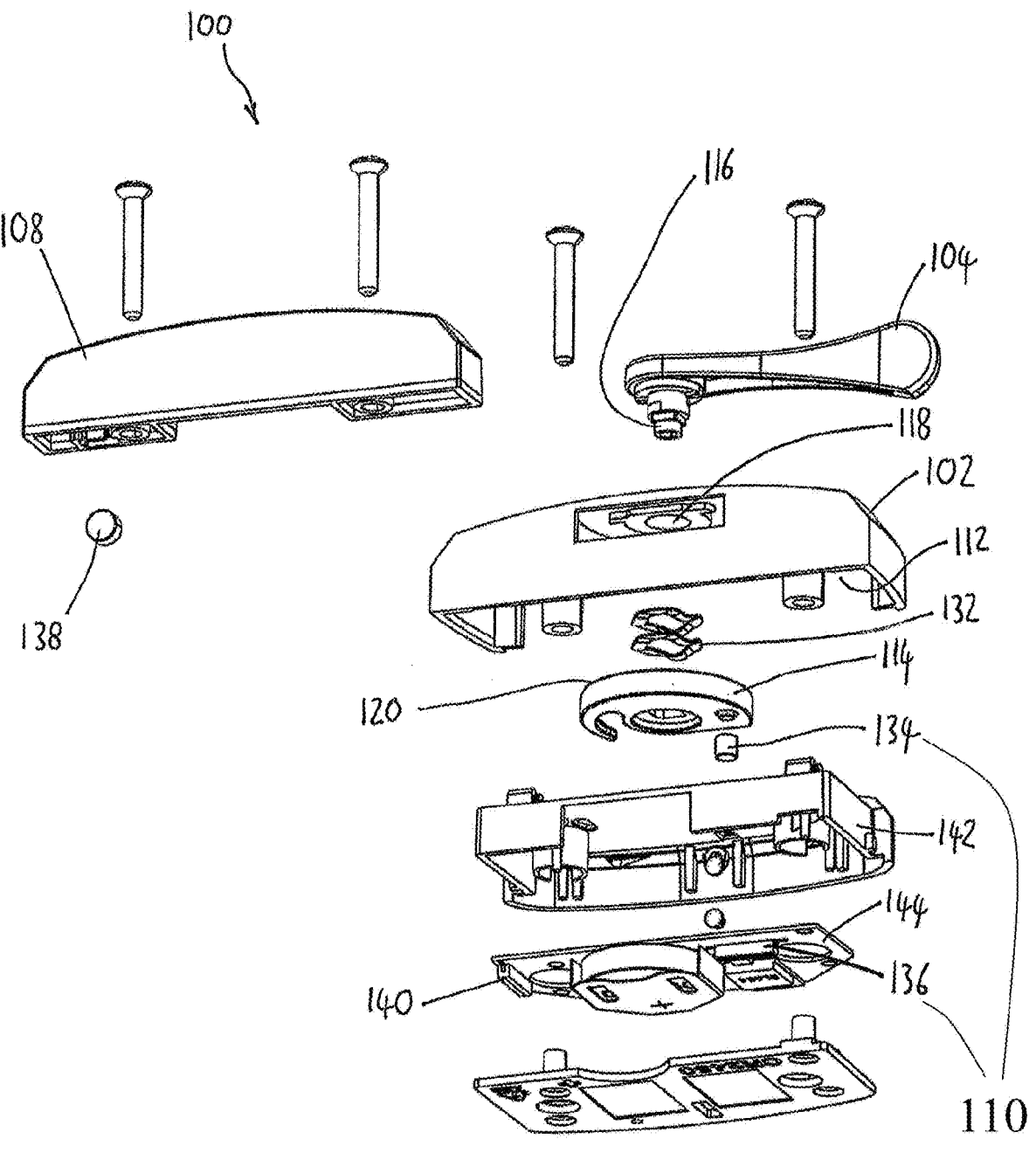
FIG. 3 is an exploded view of the locking device of FIG. 1.
Figure 4A:
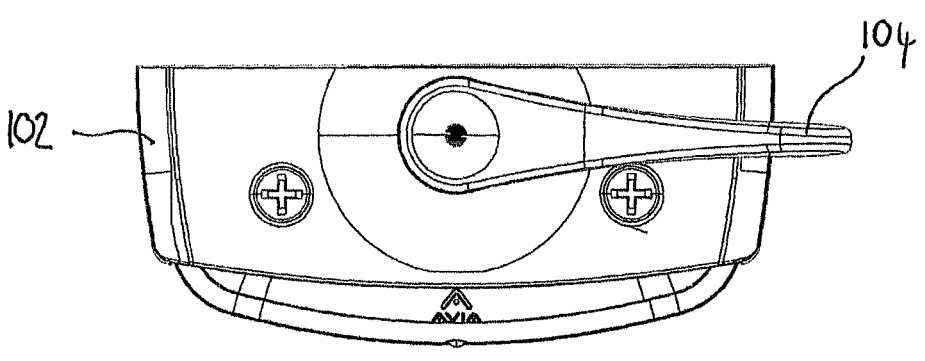
FIGS. 4A, 4B and 4C are top views of the locking device of FIG. 1, showing a locking mechanism in an unlocked position, an intermediate position, and a locked position, respectively.
Figure 4B:
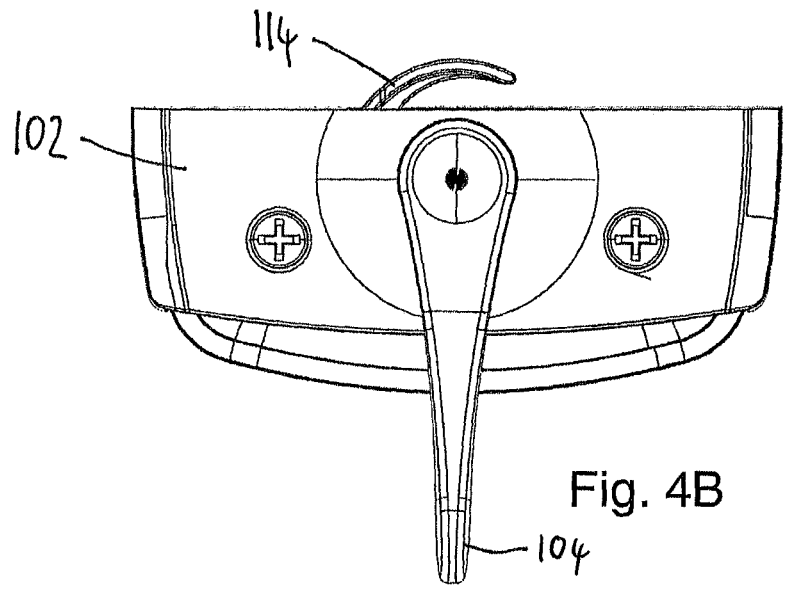
Figure 4C:
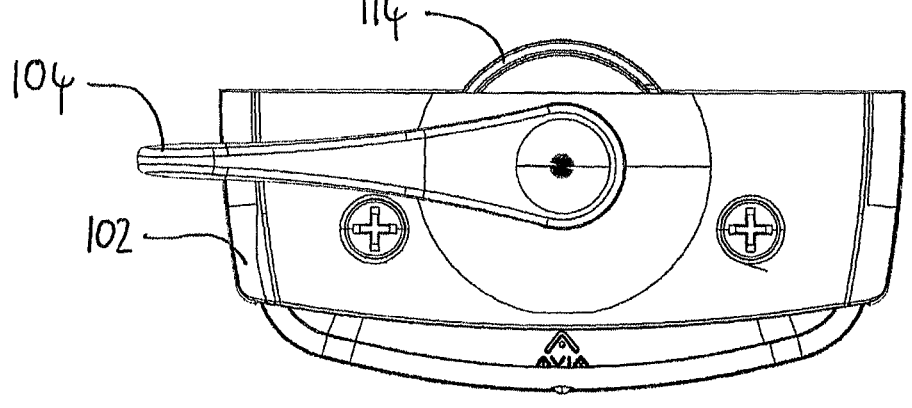

Referring additionally to FIGS. 2 and 3, the body 102 comprises a generally hollow interior 112. The locking mechanism 106 comprises a locking element 114. The locking element 114 and the handle 104 are pivotally (rotatably) mounted to the body 102. The handle 104 is connected to the locking element 114 such that pivoting of the handle 104 causes turning (rotation) of the locking element 114. In particular, the handle 104 comprises a spindle 116 and the locking element is 114 connected to the spindle 116. The spindle 116 extends through an aperture 118 in the body 102 and is connected to the locking element 114 in the hollow interior 112 of the body 102. The locking element 114 is partially housed in the hollow interior 112. The locking element 114 is moveable (by pivoting/turning/rotating the handle 104) between a locked position, in which the locking element 114 protrudes from the body 102, and an unlocked position in which the locking element 114 is retracted into the body 102. In use, in the locked position, the locking element 114 is arranged to engage with part of the keep 108 so as to secure the body 102 to the keep 108, and therefore to lock the window sashes 12, 14 to one another.

In this embodiment, the locking element 114 is in the form of a truncated wheel. The locking element 114 may also be referred to as a cam, and such a locking mechanism may be known as a cam lock. The locking element 114 is arranged to engage with the keep 108. The locking element 114 comprises an arcuate (circumferential) peripheral rim 120 which extends part way around a periphery of the locking element 114 and which is arranged to engage with part of the keep 108. An end portion of the peripheral rim 120 is ramped to provide an engagement portion 122. The rim provides a flange or wall having an upper surface which may contact a part of the keep which may urge the two window sashes toward each other into a close/tight fit together. This may help to prevent rattling in the wind etc.

As can be seen most clearly in FIG. 2, the keep 108 comprises a recess 124 and a projection in the form of a projecting tooth 126 disposed in the recess 124 and specifically on the front open face of the recess 124. The tooth 126 projects downwardly in use, adjacent an opening of the recess 124. When the lock body 102 and the keep 108 are aligned (e.g. when the window sashes 12, 14 are in a closed position) the locking element 114 is arranged to extend into the recess 124 when the locking element 114 is in the locked position. In this way, the locking element 114 is arranged to secure the body 102 to the keep 108 to prevent movement of the sashes 12, 14 and opening of the window 10. When the locking element 114 is in the unlocked position, the locking element 114 does not extend into the keep 108, such that the window sashes 12, 14 may be slidably moved relative to one another. The locking element 114 is arranged to be rotatably moved into and out of engagement with the keep 108. In particular, the circumferential rim 120 is arranged to move and curve behind the tooth 126. The engagement of the locking element 114 with the keep 108 prevents the sash windows moving apart and also sliding up/down relative to each other.

The projecting tooth 126 is arranged to engage with the locking element 114. In particular, the tooth 126 is arranged to engage with the locking element 114 when the locking element 114 is in the locked position. The tooth 126 is arranged to engage with, and be retained by, the peripheral rim 120 as the locking element 114 is turned to the locked position. With this arrangement, relative lateral movement of the window sashes 12, 14 (i.e. generally perpendicular to a plane of sliding of the window sashes 12, 14) is reduced or prevented, such that the locking element 14 does not escape the keep 108 when the locking element 114 is in the locked position. Such movement may otherwise occur where guide channels (not shown) in which the sashes 12, 14 slide have relatively larger tolerances such that the sashes 12, 14 are relatively 'loose' in their respective guide channels.

The ramped engagement portion 122 of the locking element 114 is arranged to reduce the effect of any misalignment of the locking element 114 with the keep 108 when a user operates the locking mechanism 106. For example, if the window sashes 12, 14 are not exactly aligned (e.g. slightly displaced from the closed position), the locking element 114 may still engage with the keep 108. As a user operates the handle 104 to turn the locking element 114 towards the locked position, the ramped engagement portion 122 engages with an edge of the recess 124 and acts to urge the recess 124 and the locking element 114 into alignment with one another (thereby aligning the keep 108 with the body 102).

To prevent unwanted movement of the handle 104 (and therefore of the locking element 114), the locking device 100 comprises a detent mechanism which is arranged to releasably detain the handle 104 and locking element 114 in either the locked position or the unlocked position.

Figure 5:
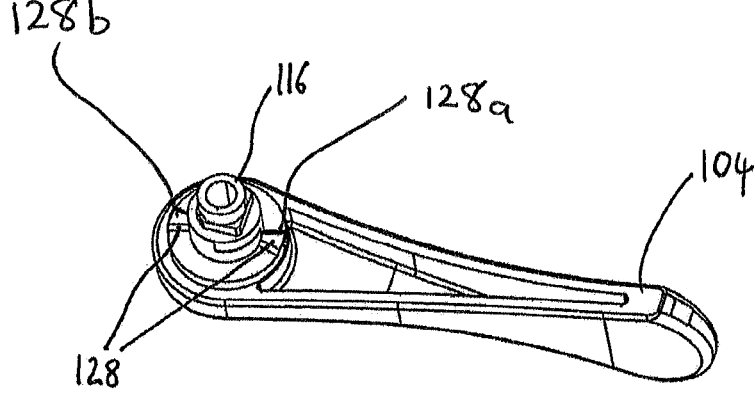
FIG. 5 is a perspective view of part of the locking device of FIG. 1.
Figure 6:
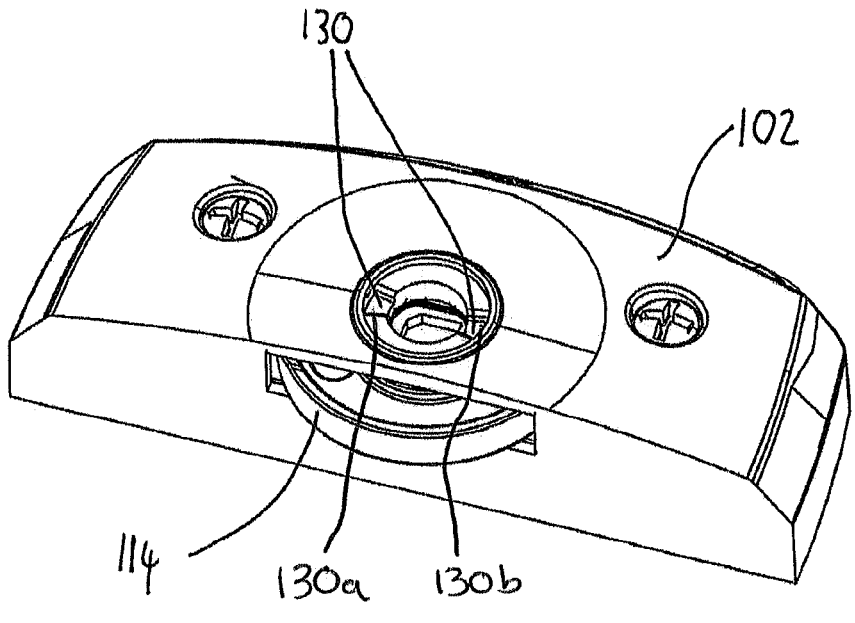
FIG. 6 is a perspective view of part of the locking device of FIG. 1.

Referring additionally to FIGS. 5 and 6, the detent mechanism comprises a pair of first detent formations 128 in the form of projections/lugs/raised elements provided on the handle 104 adjacent the spindle 116. FIG. 5 shows an underside view of the handle 104 (which would face downwardly towards the body 102 in use) to show the first detent formations 128. The detent mechanism further comprises a pair of corresponding second detent formations in the form of detent notches 130 or recesses provided on the body 102 adjacent the aperture 118 for the spindle 116. The first detent formations 128 are arranged to align with, and engage with, the detent notches 130, when the handle 104 is in the unlocked position or in the locked position (but not an intermediate position). The spindle 116 is axially displaceable with respect to the body 102. Biasing means (which in this embodiment are in the form of a pair of wave washers 132 disposed on the spindle 116 between the locking element 114 and the body 102) are provided to bias the spindle 116 into the body 102, thereby biasing the handle 104 towards the body 102. In this way, the first detent formations 128 are biased into engagement with the detent notches 130 when the handle 104 is in the locked or unlocked positions. With this arrangement, a threshold force is required to urge the first detent formations 128 out of engagement with the detent notches 130 in order to pivot the handle 104 away from the locked position or from the unlocked position. The handle 104 'snaps' into the locked or unlocked positions. Accordingly, this mechanism provides physical feedback to a user of the locking device 100 to enable a user to determine whether the handle 104 (and therefore the locking element 114) has been moved fully to the unlocked position, the locked position, or an intermediate position. This helps to avoid the locking device 100 being left in a partially locked position which may not effectively secure the window 10, and also helps to avoid accidental movement of the handle 104.

In some embodiments, the locking device may further comprise a secondary locking mechanism (e.g. a key operated lock) arranged to secure the handle in the locked position.

Prior art sensor systems are available to detect whether a window is open or closed. However, unfortunately, many windows may be simply closed without being locked, and/or without a locking mechanism having been correctly set. For example, a window sash may be slid closed manually, or under gravity, without a locking device being operated to secure the window sash(es) in the closed position. Accordingly, a window may have the appearance (e.g. by visual inspection or by a prior art simple sensor system) of being secured (e.g. correctly closed and locked), but the window actually could be opened manually by a user, e.g. by sliding a window sash. A window could therefore be opened from the outside (i.e. exterior of a building). Such prior art sensor systems may therefore give a false representation of the security status of a window.

The present invention provides a window status sensor system which provides feedback on the position of the locking mechanism 106 and also the position of the window sash or sashes 12, 14. In particular, the present invention provides a signal concerning the definite position of the locking element 114 (and therefore the position of the handle 104) and also the definite position of the sash(es) 12, 14. Accordingly, a user can determine that the window 10 is actually both closed and locked (i.e. secured) rather than the window 10 being merely in a closed position but not locked, or the locking mechanism 106 being in a locked position but the window 10 not closed or even with the handle being turned but not fully engaging the locking element 114 in the keep 108. The window status sensor system detects and monitors the actual positions of both the locking mechanism 106 and the window sashes 12, 14 rather than just monitoring the position of the window sashes 12, 14 or the handle. Accordingly, this feedback provides reassurance that the locking element 114 is engaged with the keep 108 in order to lock the window 10.

The sensor system of the present invention comprises a first sensor and a second sensor. The locking device 100 comprises a first sensor configured to detect a position of the locking mechanism 106 (specifically the position of the locking element 114) and a second sensor configured to detect a position of the window sash or sashes 12, 14. In this embodiment, the second sensor is arranged to detect a position of the upper window sash 14 with respect to the lower window sash 12. In some embodiments, only one of the upper and lower sashes 12, 14 may be moveable in the window frame, in which case the second sensor may be arranged to detect a position of the sole moveable window sash. In the present embodiment, the first sensor is arranged to detect a position of the locking element 114. Since the locking element 114 is connected to the handle 104, the first sensor also detects a position of the handle 104. However, the position of the handle 104 is secondary and the present invention includes a sensor arrangement which confirm that the locking element 114 is in fact engaged within the keep 108.

Figure 7:
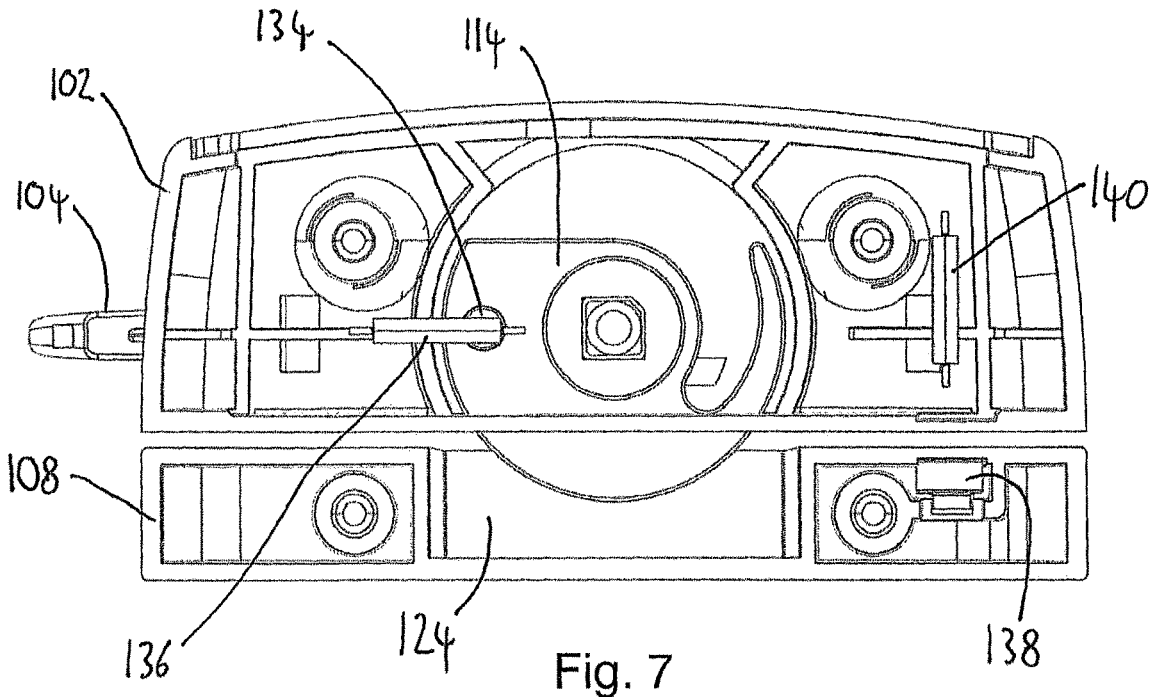
FIGS. 7 and 8 are bottom views of part of the locking device of FIG. 1, showing the locking mechanism in a locked position and in an unlocked position, respectively.
Figure 8:
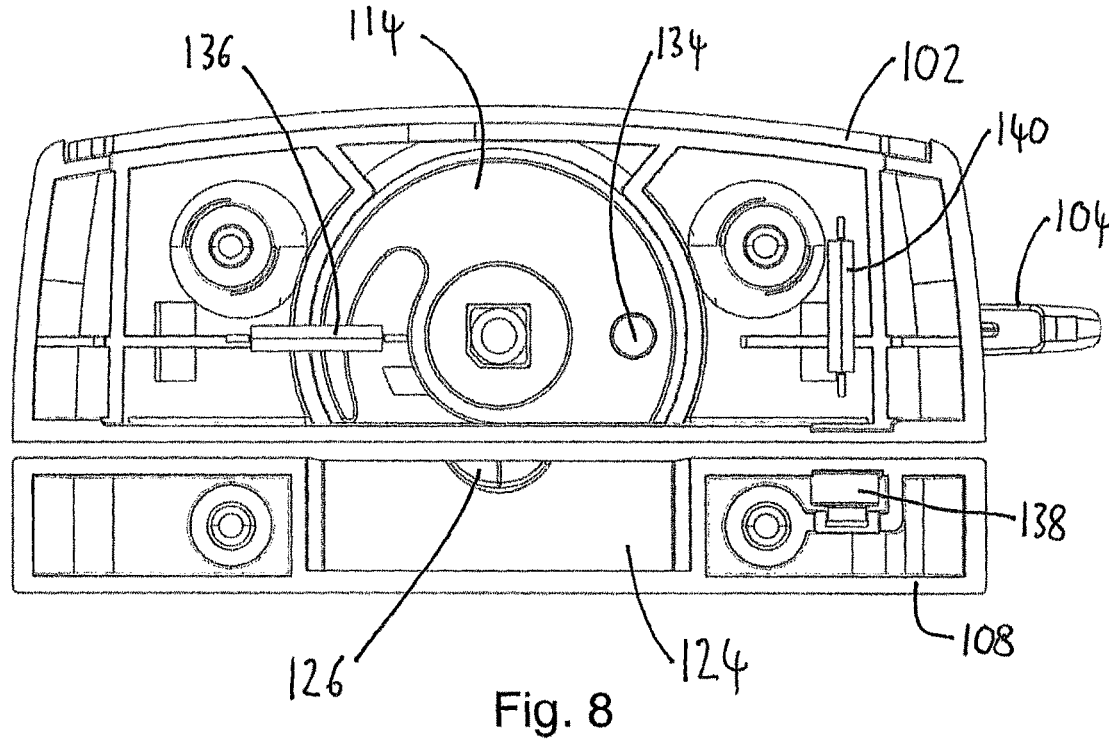

The first sensor comprises a first lock sensor component mounted to the locking element 114 and a second lock sensor component mounted to the body 102. FIGS. 7 and 8 show a bottom (underside) view of the locking device 100 with some components omitted for clarity. In this embodiment, the first lock sensor component comprises a first magnet 134 mounted in a bore in the locking element 114. The first magnet 134 is fixed to the locking element 114 such that the first magnet 134 moves when the locking element 114 turns (e.g. upon turning the handle 104). The second lock sensor component comprises a first reed switch 136 disposed in the body interior 112. The first magnet 134 is arranged to change a status of the first reed switch 136 as the locking element 114 moves. In particular, the first magnet 134 is arranged to change a status of the first reed switch 136 depending on whether the locking element 114 is in the closed position or the open position. As the magnet 134 moves relative to the reed switch 136, the reed switch 136 is arranged to change status (e.g. from a closed state to an open state or vice versa). In this embodiment, the first magnet 134 is arranged to be in closer proximity to the reed switch 136 when the locking element 114 is in the locked position (as shown in FIG. 7) and the first magnet 134 is moved pivotally away from the first reed switch 136 when the locking element 114 is in the unlocked position (as shown in FIG. 8).

The detent mechanism described above acts synergistically with the positional arrangement of the lock sensors 136, 134 to provide a reliable system which can be trusted by a user such that an alert will not be questioned and/or ignored. In particular, the detent mechanism holds the handle 104 (and hence the locking element 114) in a set position in which the first lock sensor 134 locates directly above the second lock sensor 136 in the locked position. Accordingly, this reliably sets the location of the first lock sensor 134 at a position where it is known that it will trigger the second lock sensor 136 and not at an undefined/intermediate position. The detents are configurations are circumferentially offset by 180 degrees such that the detent mechanism provides for a second position where the lock is in an unlocked configuration. In this defined position, the first lock sensor 134 is located at a furthest most position from the second lock sensor 136. Accordingly, in this position, it will be known that the first lock sensor 134 cannot trigger the second lock sensor 136 and this will reliably show that the lock is in an unlocked configuration. These two clearly defined positions which are set by the two detent configurations ensure that undefined intermediate positions are not selected by a user which provides for a reliable warning system. In particular, in the closed position the first lock sensor 134 locates with a minimum separation distance to the second lock sensor 136 and in the unlocked position the first lock sensor 134 locates at a maximum separation distance relative to the second lock sensor 136.

Accordingly, the first sensor will alert a user as to whether the locking mechanism 106 is in a locked position or an unlocked position. As mentioned above, this does not guarantee that the window 10 is in a closed position. The window 10 may in fact be in an open position but the locking mechanism 106 may be in a locked position.

The locking device 100 therefore provides a second sensor comprising a first window sensor component mounted to the body 102 and a second window sensor component arranged to be mounted to a window sash or a window frame. In this embodiment, the second window sensor component is disposed in the keep 108, which is mounted to the upper window sash 14. The second sensor provides a proximity sensor which is arranged to detect if the first and second window sensor components are located adjacent to each other (indicating that the window 100 is closed) or are spaced apart (indicating that the window 100 is open).

In the present embodiment, the first window sensor component comprises a second magnet 138 mounted to the keep 108. The second window sensor component comprises a second reed switch 140 disposed in the body interior 112. As can be seen most clearly in FIGS. 7 and 8, the second reed switch 140 is mounted adjacent a side of the body 102 which meets the keep 108 in use. The second reed switch 140 is arranged to align with the second magnet 138 when the window sashes 12, 14 are in a closed position. The second magnet 138 is mounted in a recess in the keep 108. The second magnet 138 is arranged to change a status of the second reed switch 140 as the second magnet 138 moves relative to the second reed switch 140. In this way, the second sensor is arranged to detect whether the window sashes 12, 14 are in the open position or the closed position. It will be appreciated that in the present embodiment, the second sensor will detect whether both (upper and lower) widow sashes 12, 14 are in the closed position, or whether either (or both) of the window sashes 12, 14 are in the open position. Only one of the window sashes 12, 14 need be moved away from the closed position (and therefore moved relative to the other of the window sashes 12, 14) in order to move the first and second window sensor components away from one another so as to allow detection of the window 100 being open. In other embodiments, there may be only one moveable window sash, in which case one of the keep 108 or body 102 may be mounted to the window sash, and the other of the keep 108 or body 102 may be mounted to a frame 11 of the window 100.

It will be appreciated that the detent mechanism described above works in conjunction with the sensor system to improve the reliability of the locking device 100 and sensor system. In particular, the detent mechanism provides feedback to a user to enable a user to determine whether the locking element 114 is fully in a locked position, fully in an unlocked position, or in in an intermediate position. Since, in this embodiment, the locked position of the locking element 114 corresponds to the first magnet 134 being proximate the first reed switch 136, the detent mechanism provides feedback to the user to indicate that they have moved the locking element 114 (by turning the handle 104) sufficiently far as to fully engage the locking element 114 and also to produce a 'locked' status of the first sensor. Accordingly, the detent mechanism helps to provide accurate signals from the sensor system which correspond to an actual status of the window locking device 100 and window 10. For example, without such a detent mechanism, a user may test whether they have turned the handle 104 far enough to lock the window 10 by attempting to open the window 10. This may not provide a reliable indication of whether the window 10 is locked securely, nor whether the sensor components 134, 136, 138, 140 are suitably well aligned to allow the sensor system to report accurately on the status of the locking device 100.

As mentioned above, the detent mechanism includes biasing means such that a threshold force must be applied to overcome the detent mechanism in order to move the locking element 114 away from the locked position or the unlocked position. The first detent formations 128 comprising projections or lugs are provided on the handle 104. The second detent formations 130 comprising recesses or notches are provided on the body. The detent mechanism has a pair of first detent formations 128 and a corresponding pair of second detent formations 130 which are circumferentially spaced apart by substantially 180 degrees. The handle 104 (and locking element 114) are rotatable through 180 degrees from a retained locked position to a retained unlocked position. In the retained locked position, a first projection 128a engages in a first recess 130a and a second projection 128b engages in a second recess 130b. In the retained unlocked position, the first projection 128a engages in the second recess 130b and the second projection 128b engages in the first recess 130a.

The detent mechanism is in register with the first lock sensor 134 and the second lock sensor 136 such that when the detent mechanism engages the locking element 114 in the locked position the first lock sensor 134 locates directly adjacent/next to/above the second lock sensor 136. In particular, the detent mechanism is in register with the first lock sensor 134 and the second lock sensor 136 such that when the detent mechanism engages the locking element 114 in the unlocked position the first lock sensor 134 locates at a furthest point from the second lock sensor 136. Accordingly, the arrangement provides a reliable signal which guarantees that the actual locking element 114 is in the locked position even if the locking handle 104 or other indication may not be totally aligned with a locked position and also minimises any chance of the sensor indicating a locked position when the locking element 114 is in the unlocked position or in a partially locked position.

The locking element 114 is rotatably mounted in the body 102 and the first lock sensor 134 is mounted on the locking element 114 for rotation therewith and wherein rotation of the locking element 114 changes the separation distance between the first lock sensor 134 and the second lock sensor 136. In the locked position, the first lock sensor 134 locates with a minimum possible separation distance relative to the second lock sensor 136 and, in the unlocked position, the first lock sensor 134 locates with a maximum separation distance relative to the second lock sensor 136. The first lock sensor 134 rotates about an axis with a radius of travel and wherein in a planar view (as shown in FIG. 7 and FIG. 8), the position of the first lock sensor 134 coincides with the position of the second lock sensor 136 and in the unlocked position, the first lock sensor 134 is spaced from the second lock sensor 136 by twice the radius of travel.

In some embodiments, the first lock sensor component (e.g. first magnet) may be provided in the handle 104. However, it will be appreciated that providing the first lock sensor component in the locking element 114 (as in the present embodiment) improves the reliability of the locking device 100, by reducing the effect of any rotational misalignment between the handle 104 and the locking element 114 (e.g. as a result of damage or incorrect assembly). With this arrangement, the first sensor detects a position of the locking element 114 directly, rather than detecting a position of the locking element 114 indirectly by detecting a position of another part of the locking mechanism 106 such as the handle 104.

Figure 9:
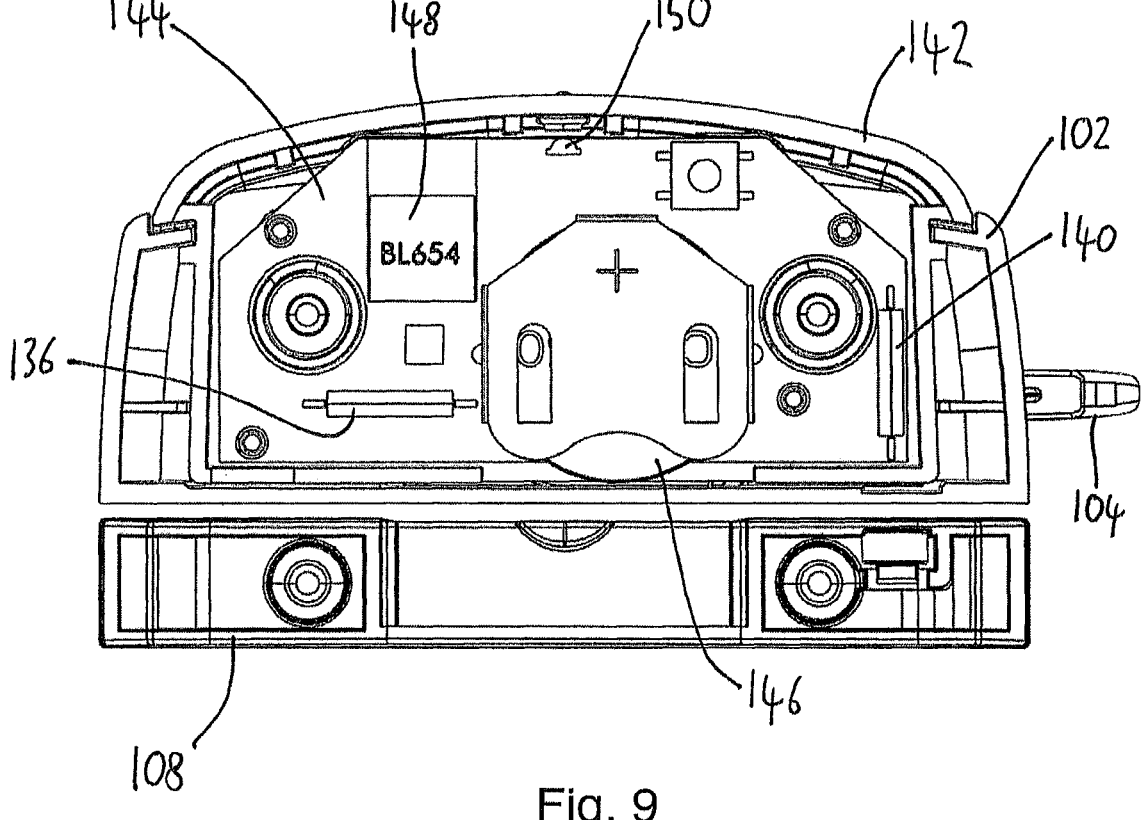
FIG. 9 is a bottom view of the locking device of FIG. 1.

In the present embodiment, the locking device 100 comprises circuitry contained in a housing 142 mounted to the body 102. As can be seen in FIG. 9, the circuitry comprises a printed circuit board (PCB) 144 and components, and in this embodiment comprises the first and second reed switches 136, 140. The circuitry further comprises a power source 146 (e.g. a cell or battery). The circuitry may comprise a processor (e.g. one or more microprocessors).

In this embodiment, the locking device 100 comprises communication means which is arranged to communicate the status of the two sensors to a user. For example, the window sensor system provided by the locking device 100 may comprise a part of a home security system controlled by a single operating system to continuously monitor several windows, doors etc. at the same time. The communications system operates by using a Wi-Fi system (or Bluetooth) and a hub may be arranged to alert a user who may be located in the Wi-Fi catchment area, or remotely away from the Wi-Fi catchment area. For example, the locking device 100 may form part of a home security system which may be monitored remotely by a user, e.g. using a portable device having an internet connection. In the present embodiment, the locking device 100 comprises a Bluetooth module 148.

In some embodiments, the locking device may comprise an impact sensor in the form of a microelectromechanical system (MEMS) device which may comprise an accelerometer. The impact device may be arranged to detect shocks and repeated impacts which may signal an attempt to break, or force open the window. For example, the impact sensor may detect repeated impacts which are not consistent with environmental factors (e.g. wind, weather etc.), adjacent building vibrations or normal opening forces. The impact sensor may therefore detect unauthorised attempts to open the window.

Figure 10:
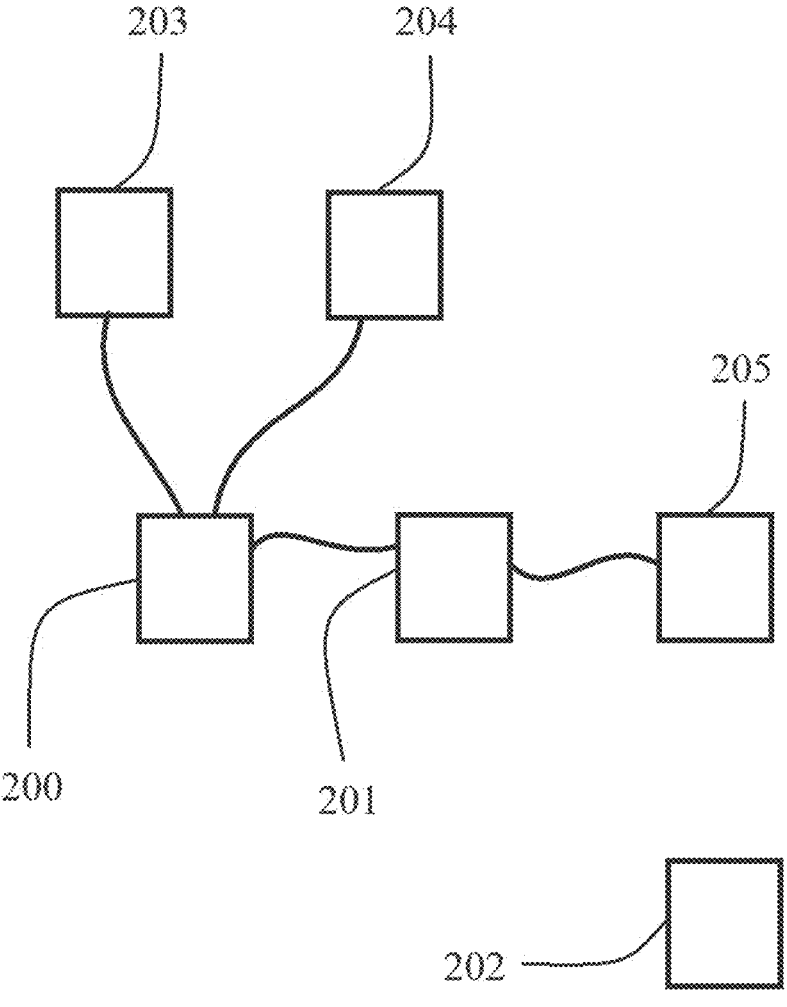
FIG. 10 schematically depicts a communication module that is connected to a control hub, and the control hub is connected to a router in order to communicate signals from first and second sensors.

As mentioned above, the locking device 100 comprises transmission means in order to communicate the status of the window through the local Wi-Fi network and/or through Bluetooth. This signal may be communicated to a cloud server and then subsequently to the smartphone of the user. The locking device 100 may form one part of a home automation system including a number of sensors to enable a user to monitor the status of various devices and receive targeted alerts. Where a plurality of locking devices are provided in such a system, each locking device is individually coded such that a software application (app) on the smartphone will be able to correctly identify the individual window, for example 'bedroom window'. FIG. 10 schematically depicts a communication module 200 that is connected to a control hub 201, and the control hub 201 is connected to a router 202 in order to communicate signals from a first sensor 203 and a second sensor 204 to a remote unit 205.

The locking device 100 further comprises a visual indicator which is arranged to indicate a status of the locking device and/or the window. In this embodiment, the visual indicator comprises a light emitting diode (LED) 150 which is visible through an aperture in the body 102. The locking device 100 may be configured such that the LED 150 indicates a status of the locking mechanism 106 and/or a position (i.e. open or closed) of the window 10. For example, the LED 150 may be on (i.e. illuminated) when the device 100 is locked, and off when the device 100 is unlocked. In some embodiments the LED may flash and/or change colour to indicate a status of the locking mechanism (e.g. a position of the locking element and/or handle) and/or a position of the window sash(es).

Overall the window locking device provides a window status sensor system which is solely operated by the position of a window locking mechanism in combination with the position of a window sash (or sashes). This arrangement reduces the risk of obtaining a false positive signal which may lead a user to believe that a window is in the locked position when in fact the window locking mechanism has not been correctly engaged. The position of the locking mechanism corresponds to the position of a handle used to operate the locking mechanism. The position of the window sash may be relative to a window frame and/or another window sash.

The invention claimed is:

1. A locking device for a sash window having a window sash moveably mounted in a window frame, the locking device comprising:

a body for mounting to the sash window;

a locking element moveable between an unlocked position and a locked position;

a sensor system to detect whether the window sash is in a closed position in the window frame and also to detect whether the locking element is in the locked position; and a detent mechanism, the sensor system comprising;

a first sensor and a second sensor;

the first sensor comprising a first lock sensor component mounted for movement with the locking element and a second lock sensor component mounted to the body; and the second sensor comprising a first window sensor component arranged to be mounted to the sash window and a second window sensor component mounted to the body, the detent mechanism arranged to releasably retain or detain locking element in the locked position or the unlocked position, the detent mechanism comprising a biasing member such that a threshold force must be applied to overcome the detent mechanism in order to move the locking element away from the locked position or the unlocked position.

2. A locking device for a sash window according to claim 1 in which the first lock sensor component is mounted to the locking element.

3. A locking device for a sash window according to claim 1 in which the locking element comprises a bore into which the first lock sensor component is located.

4. A locking device for a sash window according to claim 1 in which the first lock sensor component is integral with the locking element.

5. A locking device for a sash window according to claim 1 in which the locking element is rotatably mounted in the body and the locking element comprises a peripheral engaging rim which is arranged to be rotated to locate within a keep to form a locked configuration and, in which, the peripheral engaging rim is arranged to be rotated through 180 degrees between an unlocked configuration and a locked configuration.

6. A locking device for a sash window according to claim 1 in which the first lock sensor component comprises a magnet and the second lock sensor component comprises a reed switch.

7. A locking device for a sash window according to claim 1 in which the first window sensor component comprises a magnet and the second window sensor component comprises a reed switch.

8. A locking device for a sash window according to claim 1 in which the detent mechanism comprises first and second detent formations which are arranged to engage with one another in order to detain the locking element in the locked position or the unlocked position.

9. A locking device for a sash window according to claim 1 in which the first detent formations are provided on the handle and the second detent formations are provided on the body.

10. A locking device for a sash window according to claim 1 in which the detent mechanism comprises a pair of first detent formations and a corresponding pair of second detent formations which are circumferentially spaced apart by substantially 180 degrees, the detent formations comprising projections and corresponding recesses, wherein the handle is rotatable through 180 degrees from a retained locked position to a retained unlocked position and in which, in the retained locked position, a first projection engages in a first recess and a second projection engages in a second recess and in the retained unlocked position, the first projection engages in the second recess and the second projection engages in the first recess.

11. A locking device for a sash window according to claim 1 in which the detent mechanism is in register with the first lock sensor and the second lock sensor such that when the detent mechanism engages the locking element in the locked position the first lock sensor locates directly above the second lock sensor.

12. A locking device for a sash window according to claim 1 in which the detent mechanism is in register with the first lock sensor and the second lock sensor such that when the detent mechanism engages the locking element in the unlocked position the first lock sensor locates at a furthest point from the second lock sensor.

13. A locking device for a sash window according to claim 12 in which the locking element is rotatably mounted in the body, the first lock sensor is mounted on the locking element for rotation therewith and wherein rotation of the locking element changes the separation distance between the first lock sensor and the second lock sensor.

14. A locking device for a sash window according to claim 13 in which, in the locked position, the first lock sensor locates with a minimum possible separation distance relative to the second lock sensor and in the unlocked position the first lock sensor locates with a maximum possible separation distance relative to the second lock sensor.

15. A locking device for a sash window according to claim 1 in which the first lock sensor rotates about an axis with a radius of travel and wherein in a planar view, the position of the first lock sensor coincides with the position of the second lock sensor and in the unlocked position, the first lock sensor is spaced from the second lock sensor by twice the radius of travel.

15

16

16. A locking device for a sash window according to claim 1 in which the locking device comprises a keep which is arranged to be mounted to the sash window, the keep being arranged to retain the locking element in order to secure the window in the closed position and in which the keep may be separate from the body.

17. A locking device for a sash window according to claim 16 in which the first window sensor component is mounted in the keep.

18. A locking device for a sash window according to claim 1 in which the locking device comprises a communication module to communicate signals from each sensor to a remote unit.

19. A locking device for a sash window according to claim 18 in which the communication module is arranged to be connected to a control hub and the control hub is connected to a router in order to further communicate the signals from the locking device.

20. A locking device for a sash window according to claim 19 in which the control hub combines the signals from both sensors.

21. A window assembly comprising a window sash, a window frame and a locking device, the locking device comprising:

a body for mounting to the sash window;
a locking element moveable between an unlocked position and a locked position;
a sensor system to detect whether the window sash is in a closed position in the window frame and also to detect whether the locking element is in the locked position; and
a detent mechanism,
the sensor system comprising;
a first sensor and a second sensor;
the first sensor comprising a first lock sensor component mounted for movement with the locking element and a second lock sensor component mounted to the body; and
the second sensor comprising a first window sensor component arranged to be mounted to the sash window and a second window sensor component mounted to the body,
the detent mechanism arranged to releasably retain or detain the locking element in the locked position or the unlocked position,
the detent mechanism comprising a biasing member such that a threshold force must be applied to overcome the detent mechanism in order to move the locking element away from the licked position or the unlocked position.

22. A home automation system comprising a least one window status sensor system for monitoring a sash window having a window sash moveably mounted in a window frame and including a locking device comprising:

a body for mounting to the sash window;
a locking element moveable between an unlocked position and a locked position;
a sensor system to detect whether the window sash is in a closed position in the window frame and also to detect whether the locking element is in the locked position;
a detent mechanism,
the sensor system comprising;
a first sensor and a second sensor;
the first sensor comprising a first lock sensor component mounted for movement with the locking element and a second lock sensor component mounted to the body; and
the second sensor comprising a first window sensor component arranged to be mounted to the sash window and a second window sensor component mounted to the body,
the detent mechanism arranged to releasably retain or detain the locking element in the locked position or the unlocked position,
the detent mechanism comprising a biasing member such that a threshold force must be applied to overcome the detent mechanism in order to move the locking element away from the locked position or the unlocked position.

23. A method of providing a window status sensor system, in which the window includes a locking device, the locking device comprising:

a body for mounting to the sash window;
a locking element moveable between an unlocked position and a locked position;
a sensor system to detect whether the window sash is in a closed position in the window frame and also to detect whether the locking element is in the locked position; and
a detent mechanism,
the sensor system comprising;
a first sensor and a second sensor;
the first sensor comprising a first lock sensor component mounted for movement with the locking element and a second lock sensor component mounted to the body; and
the second sensor comprising a first window sensor component arranged to be mounted to the sash window and a second window sensor component mounted to the body,
the detent mechanism arranged to releasably retain or detain the locking element in the locked position or the unlocked position,
the detent mechanism comprising a biasing member such that a threshold force must be applied to overcome the dent mechanism in order to move the locking element away from the locked position or the unlocked position.

* * * * *